United States Patent [19]

Wilkins

[11] Patent Number: 4,676,374

[45] Date of Patent: Jun. 30, 1987

[54] HARD CASE FLOPPY DISK HOLDER

[75] Inventor: Robert F. Wilkins, Woodinville, Wash.

[73] Assignee: MicroRain Corporation, Redmond, Wash.

[21] Appl. No.: 820,267

[22] Filed: Jan. 17, 1986

[51] Int. Cl.⁴ .................... B65D 1/36; B65D 85/57
[52] U.S. Cl. ........................ 206/444; 40/405;
  206/309; 206/311; 206/452; 206/455; 206/487
[58] Field of Search ............ 206/444, 555, 487, 452,
  206/455, 488, 456, 309, 311, 387; 40/124.2, 159,
  405, 537

[56] References Cited

U.S. PATENT DOCUMENTS

| | | | |
|---|---|---|---|
| 3,777,885 | 12/1973 | Barteck | 206/488 |
| 4,119,200 | 10/1978 | Cassidy et al. | 206/459 |
| 4,185,406 | 1/1980 | Schotsman | 40/405 |
| 4,189,858 | 2/1980 | de Bruin | 40/159 |
| 4,207,980 | 6/1980 | Namiki | 206/456 |
| 4,209,923 | 7/1980 | Wendt | 40/405 |
| 4,236,635 | 12/1980 | Namiki | 206/456 |
| 4,332,320 | 6/1982 | Feibelman | 206/487 |
| 4,427,727 | 1/1984 | Ozeki | 206/456 |
| 4,508,366 | 4/1985 | Brindle | 206/444 |
| 4,589,551 | 5/1986 | Heller | 206/456 |

FOREIGN PATENT DOCUMENTS 1218994  6/1966  Fed. Rep. of Germany ........ 40/405

*Primary Examiner*—George E. Lowrance
*Assistant Examiner*—Brenda J. Ehrhardt
*Attorney, Agent, or Firm*—Seed and Berry

[57] ABSTRACT

A rigid holder for three and one-half inch hard case floppy diskettes. The holder contains 12 diskettes in an array on each side, with each array having two columns of three rows of diskette receptacles. The diskettes are received in the receptacles and the floors of the receptacles in each column are disposed in substantially parallel spaced apart planes to position the entry wall of one receptacle above the base wall of the next adjacent receptacle in the column. The floors serve as common divider floors for corresponding receptacles in both arrays. Sidewalls are also provided to prevent lateral movement of the diskette from the receptacle. A resilient tab holds the diskette in the receptacle. The receptacles are rigidly connected together so that the holder maintains the diskettes in a rigid substantially planar page orientation.

7 Claims, 5 Drawing Figures

HARD CASE FLOPPY DISK HOLDER

TECHNICAL FIELD

The invention relates to an apparatus for holding and protecting three and one-half inch hard case floppy diskettes in an organized and convenient manner. More specifically, the invention relates to apparatus for holding diskettes of the aforementioned type in a page-like arrangement.

BACKGROUND OF THE ART

The introduction of the personal computer on the consumer market has generated a need for storing magnetic media in a convenient and efficient manner. One of the presently available means for storing software and information is on three and one-half inch flexible floppy diskettes which are contained in a hard and rigid plastic case.

Substantially transparent, flexible plastic sheets having open ended pockets for storing soft floppy diskettes are presently available. The sheets organize the diskettes onto pages for inclusion in notebooks such as three-ring binders. Storage of hard case diskettes in this fashion, however, entails a number of disadvantages. Since the pages are flexible, they tend to to flop about when the pages, loaded with diskettes, are turned, thus preventing convenient viewing and handling of the page of diskettes. Moreover, the pockets have no means to insure that the diskettes will not fall out when the pages are inverted. Also, insertion and removal of the diskettes into and out of the flexible, plastic pockets is difficult.

Thus, a need exists for a protective holder for three and one-half inch hard case floppy diskettes which can store a three-row by two-column array of hard case floppy diskettes within a space of a conventional eight and one-half inch by eleven-inch page so as to be receivable within conventionally sized and available three-ring binders. Furthermore, a need exists for such a holder which facilitates insertion and removal of diskettes from the holder and which provides firm retention of the diskettes within the holder even when inverted.

DISCLOSURE OF THE INVENTION

Basically, the present invention provides a holder for three and one-half inch hard case floppy diskettes which stores the diskettes in three rows and two columns in a substantially planar page orientation so as to be receivable in a conventional eight and one-half inch by eleven-inch three-ring binders. The holder is a generally planar page formed by an array of diskette storage receptacles rigidly connected together. In a preferred embodiment of the invention, the holder is a two-sided page with each side of the holder having a three-row-by-two-column array of receptacles disposed in back-to-back relation with the receptacles forming the array on the other side of the holder.

Each receptacle has an entry wall with an opening therein for grasping of the diskette, and a base wall spaced from the entry wall by substantially the width of a diskette. A pair of opposed sidewalls extending between the entry and base walls are spaced apart by substantially the transverse width of the diskette. The holder includes a floor with the entry and base walls and the sidewalls projecting sufficiently from the floor to restrict lateral movement of the diskette from the receptacle.

Each receptacle further includes a retainer means for resiliently retaining the diskette stored therein. The retainer means applies a yieldable force on the diskette directed toward the receptacle floor to hold the diskette in place but which still permits the edge portion of the diskette exposed at the entry wall opening to be lifted away from the floor and above the entry wall by grasping the exposed diskette edge portion. The diskette may then be pulled outward and over the entry wall for its removal from the receptacle. In a presently preferred embodiment of the invention, the retainer means is a resilient tab extending from the base wall partially toward the entry wall and spaced from the floor to bias the diskette stored therein against the floor for retention in the receptacle. The tab has a free end with an upwardly angled portion to facilitate insertion and removal of the diskette.

The floors of the receptacles in each row have a coplanar orientation, and the floors of the receptacles in each column are disposed in a substantially parallel spaced apart relationship to the next adjacent receptacle in the column. The spaced planar positioning places the entry wall of one receptacle adjacent to and above the base wall of the next adjacent receptacle in the column to facilitate removal of the diskette from the receptacle by avoiding interference from the diskette or the base wall of the next adjacent receptacle. In the two-sided embodiment of the holder, the floor of each of the receptacles on one side of the holder is a common floor with the corresponding one of the receptacles on the other side of the holder.

The holder further includes a substantially planar mounting flange attached to the receptacles along one outward edge portion thereof and extending in a columnar direction. The flange includes a plurality of holes spaced apart to correspond to the spacing of the rings of a ring binder in which the holder may be placed.

The holder further includes a substantially planar index tab flange attached to the receptacles along one outside edge portion thereof, opposite the edge portion to which the mounting flange is attached, and extending in a columnar direction. The index tab flange includes means thereon for slidably receiving and releasably securing an index tab thereto.

The holder also has a generally rectangular depression in the floor of each receptacle for the attachment of a label therein. The depression has a depth below the floor to substantially avoid interference with the diskette as it is slid into and out of the receptacle.

BEST MODE FOR CARRYING OUT THE INVENTION

Figure 1:
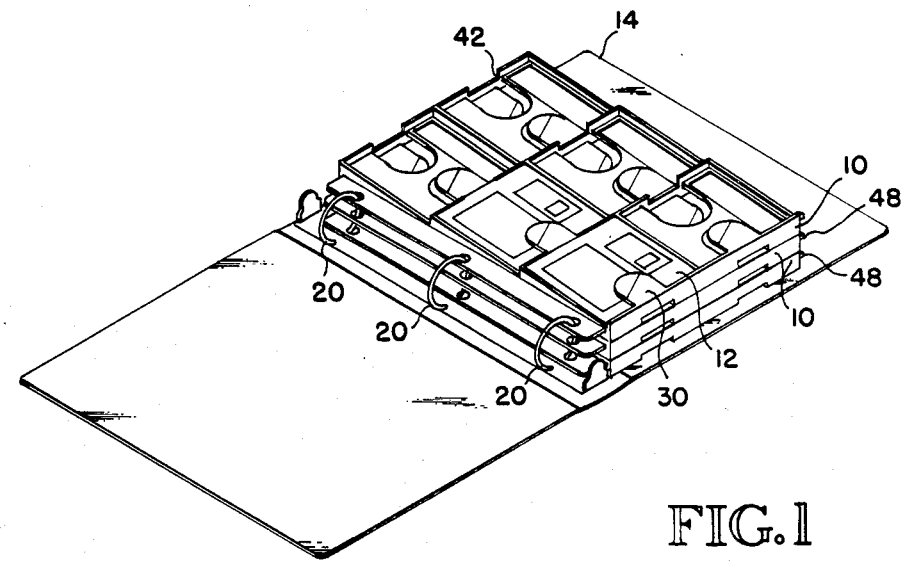
FIG. 1 is an isometric view of three holders in accordance with the present invention shown stored in a conventional three-ring binder.

A rigid holder for three and one-half inch hard case floppy diskettes, in accordance with the present invention, is generally indicated by reference numeral 10. Two hard case floppy diskettes 12 are shown in phantom lines in FIG. 2 and in solid lines in FIG. 1. FIG. 1 shows three such holders 10 contained in a conventional three-ring binder 14. The binder is of the type designed for eight and one-half inch by eleven inch standard sized sheets.

Figure 2:
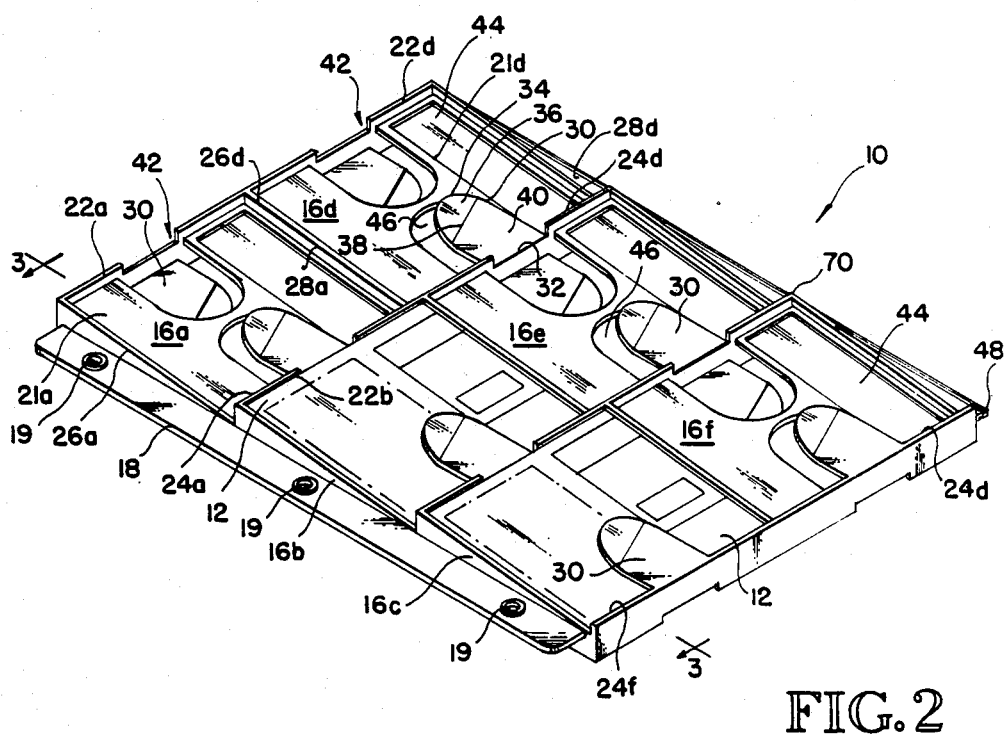
FIG. 2 is an enlarged isometric view of the holder of the present invention.

As best shown in FIG. 2, the holder 10 has twelve rigid receptacles. Each receptacle is generally indicated by the reference numeral 16. The receptacles on each side of the holder are arranged in an array of three rows and two columns. For ease of description, the receptacles 16 on one side of the holder 10 will be identified by the letters A, B, C, D, E and F, and the receptacles just opposite thereof on the other side of the holder will be identified by letters A', B', C', D', E' and F', respectively. It is noted that the receptacles on one side of the holder have a reversed longitudinal or columnar orientation from those on the other side, but are otherwise identical.

As will be described in more detail below, the receptacles are pitched at an angle relative to a mounting flange 18 provided along one longitudinal edge of the holder. The mounting flange 18 is substantially planar and oriented coplanar with the overall page arrangement of the receptacles. The mounting flange has three holes 19 spaced apart to receive the rings 20 of the binder 14.

The receptacles 16 (using receptacle 16A as an example) each have a substantially planar floor wall 21a which is bound by an entry wall 22a, a base wall 24a, a left sidewall 26a, and a right sidewall 28a. It is noted that the right sidewall 28a of receptacle 16A is common with forms the left sidewall 26d of receptacle 16D and that the base wall 24a of receptacle 16A is coplanar with and below the entry wall 22b of receptacle 16B. Similarly, the other adjacent receptacles have common and coplanar walls.

The base wall 24 of each receptacle 16 is spaced from the entry wall 22 by slightly greater than the width of the diskette, and the left and right sidewalls extend between the base and entry walls and are spaced apart by slightly greater than the width of the diskette in the transverse direction. The entry wall, base wall, and left and right sidewalls project sufficiently away from the floor wall, preferably by greater than the thickness of the diskette to prevent lateral movement of the diskette, from the receptacle. As will be described below, the entry and base walls also project sufficiently to provide support if several holders are stacked one above the other.

Figure 3:
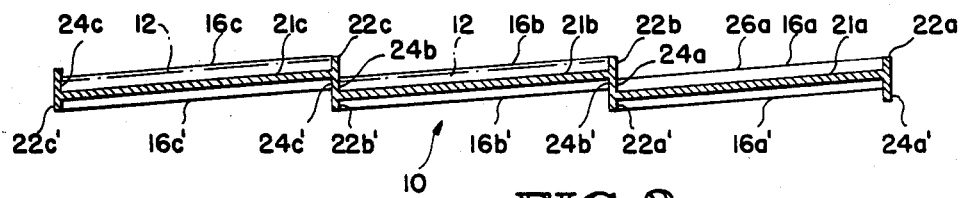
FIG. 3 is an enlarged, sectional view of the holder taken generally along lines 3—3 of FIG. 2.

The angular orientation of the receptacles 16 is best seen in FIG. 3. The planar floors 21a, 21b and 21c of the column of receptacles made up of receptacles 16A, 16B and 16C, are each angularly oriented relative to the mounting flange 18 and disposed in substantially parallel planes which are spaced apart a distance approximately equal to twice the thickness of a diskette 12 to place the entry wall 22 of each receptacle above the base wall 24 of the next adjacent receptacle in a coplanar and contiguous relationship. The floors of the receptacles 16A', 16B' and 16C' on the reverse side of the holder in the same column are similarly arranged with the entry wall 22 of one receptacle positioned directly above the base wall 24 of the adjacent receptacle. It is noted that the receptacles having an entry wall or a base wall at one or the other ends of the holder, while still having the same angular orientation, have no adjacent receptacle. The configuration is repeated with the receptacles in the other column of the array consisting of the receptacles 16D, 16E and 16F, and the receptacles indicated as receptacles 16D', 16E', and 16F'.

As shown in FIG. 3, the base wall 24 for the center receptacle in each column is a common wall with the base wall of the next adjacent receptacle in the column on the other side of the holder, and is positioned between and in coplanar and contiguous relationship with the entry wall of the next adjacent receptacle in the column on the same side of the holder and the entry wall of the corresponding receptacle on the other side of the holder. For example, the base wall 24b of the receptacle 16B is a common wall with the base wall 24c' of receptacle 16C', and is positioned in a coplanar and contiguous relationship with the entry wall 22c of the adjacent receptacle 16C and the entry wall 22b' of the receptacle 16B'. The receptacle 16B' has its base wall 24b' similarly positioned with respect to the base wall receptacle 16A and the entry walls 22b and 22a'.

As shown in FIG. 2, each receptacle 16 is provided with a resilient tab 30 which is fixedly attached by a base end 32 to the upper edge of the base wall 24 for the receptacle. The tab extends generally toward the entry wall 22 and slightly downward toward the floor wall 21, and is spaced above the floor wall by sufficient distance to receive the diskette therebetween and apply a yieldable force on the diskette to maintain it in the receptacle and pressed against the floor wall. A free end 34 of each tab has an upwardly angled end portion 36 which facilitates the insertion and removal of the diskettes to and from the receptacles. A junction portion 38 of the tab at the junction of the angled end portion 36 and a main body portion 40 of the tab is displaced above the floor wall by a distance less than the thickness of the diskette and resiliently engages the diskette. Thus, when a diskette is inserted into the receptacle, the tab 30 is resiliently deformed away from the floor thereby resiliently retaining the diskette within the receptacle.

The entry wall 22 of each receptacle 16 is provided with a centrally located opening 42 which extend from the upper edge of the entry wall to the level of the floor wall 21. This arrangement exposes the full edge portion of the diskette in the receptacle to facilitate grasping by a user desiring to remove the diskette from the receptacle. The user may grasp the edge portion of the diskette exposed through the opening 42 and lift the diskette upward, away from the floor wall and above the entry wall, against the yielding force applied by the tab 30. When the diskette clears the entry wall of the receptacle, it may be pulled in the outwardly direction away from the entry wall to fully remove the diskette from the receptacle. It is noted that this angled arrangement places the exposed end portion of a diskette at the entry wall on one receptacle above and clear of the base wall of the next adjacent receptacle in the column and the adjacent end portion of the diskette in that next adjacent receptacle. Such an arrangement is not possible with a common planar arrangement for the diskettes when in an array of rows and columns since the base wall of one receptacle or the diskette therein would block access to any opening formed in the entry wall and make grasping of the diskette difficult.

Another advantage of the angled arrangement of the receptacles is that it provides a more compact storage of the diskettes and thereby lessens the overall length of the holder. Since the diskettes 12 have a length of about three and one-half inches, the arrangement in columns of three rows each within a common plane would result in an overall length of each column of ten and one-half inches just for the diskettes. To create a holder with a page format fitting within the normal eleven inch sheet dimension, so as to fit within a conventional three ring notebook, this leaves only one-half inch to be used for walls and to provide free play in the receptacles. Since the receptacles must be slightly oversized to allow some free play for easy insertion and removal, and since the receptacle entry and base walls must have sufficient thickness to provide a strong and durable holder, the one-half inch available with a common plane arrangement has been found unsatisfactory. By angularly orienting the receptacles 16, the overall length of the holder 10 in the columnar direction can be made the desired eleven inches while still providing walls with adequate thickness for strength and the necessary amount of space for free play.

With the holder 10 of the present invention, each rigid holder may be turned in a three-ring binder, much as one would the normal flexible pages of a book and the diskettes are retained firmly within the receptacles and will not flop or slide out, even if the holder is turned upside down. This makes surveying the contents of the notebook convenient and quick. When a diskette is selected, the removal, as well as its return, are easy to accomplish. To assist in viewing the labels on the diskette, the holder, particularly the tab 30, is made of substantially transparent plastic material.

The holder further includes a depression 44 provided in the floor wall 21 off each receptacle 16 for receipt of a label therein. In this way, a removed diskette 12 can easily be returned to the correct receptacle. The use of a depression avoids the label therein interfering with the diskette as it is slid into and out of the receptacle.

The present invention allows the user to conveniently flip through his library of diskettes without the visibility problems associated with viewing diskettes contained in a conventional diskette box. The diskettes are secured within the holders so they can't fall out or bang around while still having their labels highly visible. The holders also provide a rigid protective container which assists in keeping foreign matter off the diskettes. It is noted that when several holders are stacked or positioned together in face-to-face relationship, such as shown in FIG. 1, the exterior walls of the holders are in engagement or positioned close together to provide some protection against entry of foreign matter between the holders and onto the diskettes.

To facilitate removal of the holder from a mold, for example as when the holder is molded from a plastic material, cut out portions 46 can be provided below each tab 30. In the presently preferred embodiment for the holder, the holder is molded as an integral unit.

Figure 5:
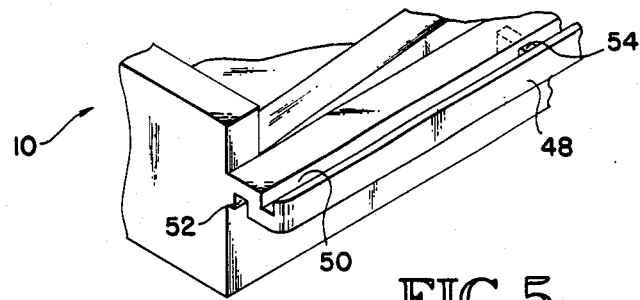
FIG. 5 is an enlarged, fragmentary isometric view of a corner portion of the holder circled in FIG. 4.
Figure 4:
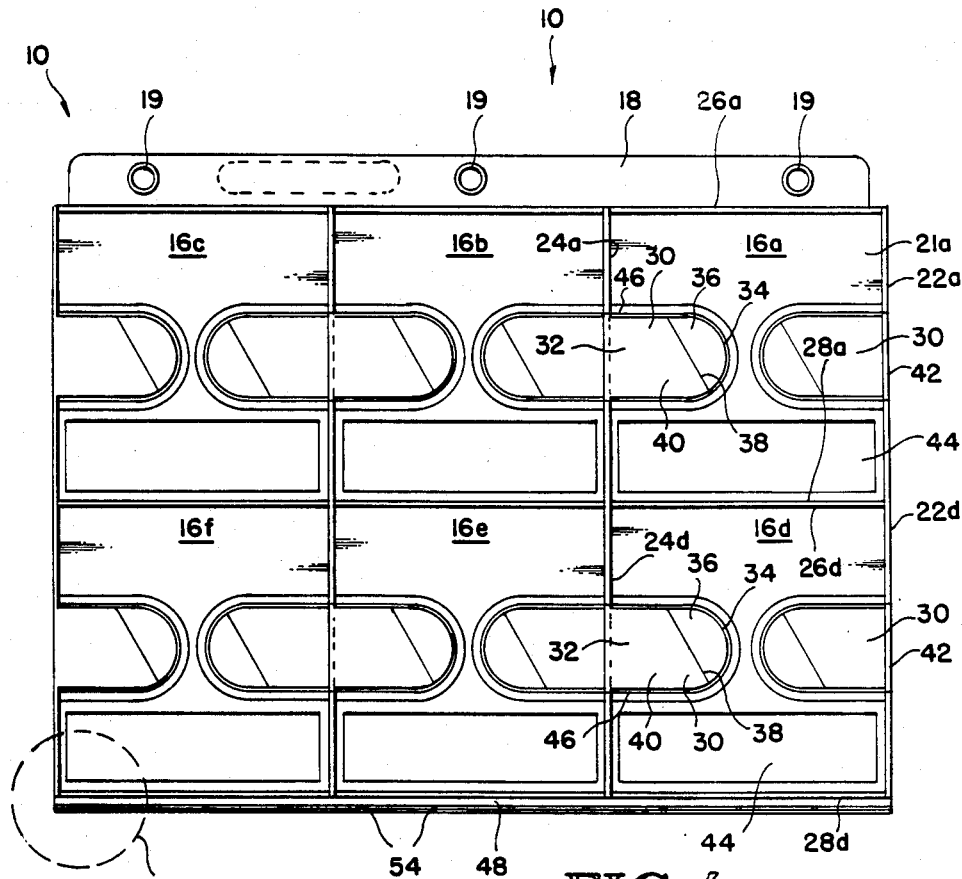
FIG. 4 is an enlarged top plan view of the holder of FIG. 2.

As best shown in FIGS. 4 and 5, along the longitudinal edge of the holder opposite the mounting flange 18 and rigidly attached thereto is an index tab flange 48. The index tab flange is shown in an enlarged view in FIG. 5 and has upper and lower longitudinally extending troughs 50 and 52, respectively, which are designed to slidably receive an index tab (not shown) of conventional design. The troughs have transverse detents 54 which releasably engage and hold the index tabs in place to maintain its position along the index tab flange as the holders 10 are handled.

To maintain correct stacking of the holders 10 one against the other as shown in FIG. 1, the entry walls 22 of the receptacles 16B, 16C and 16F on the upper side of the holder are positioned to engage and support the corresponding entry walls of the receptacles 16A', 16B', 16D' and 16E' on the lower side of the holder resting thereabove.

It will be appreciated that other variations and embodiments of the invention are contemplated. These additional embodiments have the same general characteristics as the preferred embodiment disclosed herein. Therefore, the scope of the invention is not to be limited by the above description but is to be determined by the claims which follow.

I claim:

1. A holder for personal computer hard case floppy diskettes molded of plastic as an integral unit, comprising a generally planar two-sided page for storage of hard case diskettes, each page side of the holder having a three row and two column array of receptacles rigidly connected together and disposed in back-to-back relation with said receptacles forming said array on the other page side of the holder, each receptacle having an entry wall with an opening therein for grasping of the diskette, a base wall spaced from said entry wall by substantially the width of the diskette, a pair of opposed sidewalls extending between said entry and base walls and spaced apart by substantially the transverse width of the diskette, and a planar floor, said entry and base walls and said sidewalls projecting sufficiently away from said floor to restrict lateral movement of the diskette from said receptacle in all four lateral directions, each said entry wall of each said receptacle on one page side of the holder being formed as a coplanar continuous wall with said base wall of a corresponding receptacle on the other page side of the holder, and each said sidewall of each of said receptacles on one page side of the holder being formed as a coplanar continuous wall with an opposite one of said sidewalls of a corresponding receptacle on the other page side, said receptacles in each column on both page sides being arranged with said entry wall of one receptacle positioned adjacent to and above said base wall of the next adjacent receptacle in the column on the same page side to form a coplanar continuous wall comprising said entry wall of one receptacle, said base wall of the next adjacent receptacle on the same page side and said entry wall of a corresponding receptacle on the other page side, said floor of each of said receptacles on one page side of the holder being a common floor with the corresponding one of said receptacles on the other page side of the holder, said floors of said receptacles in each row have a coplanar orientation angled relative to the general plane of the holder and said floors of said receptacles in each column are disposed in a substantially parallel spaced apart planar relation to the next adjacent receptacle in the column, each receptacle further having a resilient tab generally centrally positioned between said sidewalls and extending from said base wall partially toward said entry wall, said tab being spaced from said floor to bias the diskette stored therein against said floor for removable retention in said receptacle, said tab being resiliently yieldable to permit the edge portion of the diskette exposed at said entry wall opening to be lifted away from said floor and above said entry wall by grasping the exposed portion of the diskette for subsequent pulling over entry wall for removal from said receptacle.

2. The holder of claim 1 arranged for binding in a ring binder, further including a substantially planar mounting flange attached to said receptacles along one outward edge portion thereof and extending in a columnar direction, said flange including a plurality of holes spaced apart to correspond to the spacing between the rings of the binder.

3. The holder of claim 1 further including a substantially planar index tab flange attached to said receptacle along one outward edge portion thereof and extending in a columnar direction.

4. The holder of claim 3 wherein said index tab flange includes means thereon for slidably receiving and releasably securing an index tab thereto.

5. The holder of claim 1 wherein a free end of said tab has an upwardly angled portion to facilitate insertion and removal of the diskette within said receptacle.

6. The holder of claim 1 further including a generally rectangular depression in said floor for the attachment of a label therein, said depression having a depth below said floor to substantially avoid interference with the diskette as it is slid into and out of said receptacle.

7. The holder of claim 1 wherein said floor of each said receptacle has a pair of openings, each being positioned across from one of said tabs on each page side and being sized at least as large as said tab to facilitate removal of the holder from a mold.

* * * * *